(12) United States Patent
Colaianna et al.

(10) Patent No.: US 9,988,476 B2
(45) Date of Patent: Jun. 5, 2018

(54) MELT-PROCESSABLE PERFLUOROPOLYMERS HAVING IMPROVED THERMAL AND MECHANICAL PROPERTIES AFTER HEATING TREATMENT

(71) Applicant: SOLVAY SPECIALTY POLYMERS ITALY S.P.A., Bollate (IT)

(72) Inventors: Pasqua Colaianna, Milan (IT); Valeriy Kapelyushko, Alessandria (IT); Marco Mirenda, Rho (IT)

(73) Assignee: SOLVAY SPECIALTY POLYMERS ITALY S.P.A., Bollate (Milan) (IT)

( * ) Notice: Subject to any disclaimer, the term of this patent is extended or adjusted under 35 U.S.C. 154(b) by 51 days.

(21) Appl. No.: 14/649,140

(22) PCT Filed: Dec. 2, 2013

(86) PCT No.: PCT/EP2013/075194
§ 371 (c)(1),
(2) Date: Jun. 2, 2015

(87) PCT Pub. No.: WO2014/086694
PCT Pub. Date: Jun. 12, 2014

(65) Prior Publication Data
US 2015/0315317 A1 Nov. 5, 2015

(30) Foreign Application Priority Data
Dec. 5, 2012 (EP) ..................... 12195595

(51) Int. Cl.
| C08F 214/26 | (2006.01) |
|---|---|
| B29C 71/02 | (2006.01) |
| B29K 27/12 | (2006.01) |
| B29K 105/00 | (2006.01) |

(52) U.S. Cl.
CPC .......... C08F 214/265 (2013.01); B29C 71/02 (2013.01); C08F 214/262 (2013.01); B29K 2027/12 (2013.01); B29K 2105/0085 (2013.01)

(58) Field of Classification Search
CPC .. C08F 214/265; C08F 214/262; B29C 71/02; B29K 2027/12; B29K 2105/0085
USPC .......................................................... 264/345
See application file for complete search history.

(56) References Cited

U.S. PATENT DOCUMENTS

| 3,819,594 | A | 6/1974 | Holmes et al. |
|---|---|---|---|
| 4,262,101 | A | 4/1981 | Hartwimmer et al. |
| 4,612,357 | A | 9/1986 | Bekiarian et al. |
| 5,473,018 | A | 12/1995 | Namura et al. |
| 5,703,185 | A | 12/1997 | Blair |
| 6,066,707 | A | 5/2000 | Colaianna et al. |
| 6,262,209 | B1 | 7/2001 | Kapeliouchko et al. |
| 2003/0153701 | A1 | 8/2003 | Kono et al. |
| 2003/0158359 | A1 | 8/2003 | Colaianna et al. |
| 2009/0176952 | A1 | 7/2009 | Funaki et al. |
| 2010/0036074 | A1 | 2/2010 | Aten et al. |
| 2012/0031607 | A1 | 2/2012 | Lahijani |
| 2012/0034406 | A1 | 2/2012 | Lahijani |
| 2012/0035326 | A1 * | 2/2012 | Lahijani .................. C08L 27/18 525/200 |
| 2014/0308468 | A1 | 10/2014 | Burch |

FOREIGN PATENT DOCUMENTS

| CN | 101511887 A | 8/2009 | |
|---|---|---|---|
| CN | 103958554 A | 7/2014 | |
| EP | 789038 A1 | 8/1997 | |
| EP | 0842959 A1 * | 5/1998 | .......... C08F 214/184 |
| EP | 842959 A1 | 5/1998 | |
| EP | 1262496 A1 | 12/2002 | |

* cited by examiner

*Primary Examiner* — Ling Choi
*Assistant Examiner* — Ronald Grinsted

(57) ABSTRACT

The invention mainly pertains to a process for heat treating a composition [composition (C)] which contains at least one melt-processable perfluoropolynner [polymer (F)] formed of tetrafluoroethylene (TFE) copolymer with one or more perfluorinated comonomers [comonomer (F)] containing at least one unsaturation of ethylene type in amounts from 0.5% to 13% by weight, preferably from 0.6% to 11% by weight, and more preferably from 0.8% to 9% by weight; the process comprising at least the step of heat-treating the composition (C) at a temperature of at least 260° C. and in the absence of a melt flowable polytetrafluoroethylene. The invention is also related to a melt-processable perfluoropolynner [polymer (F1)] formed of tetrafluoroethylene (TFE) copolymer with one or more perfluorinated comonomers [comonomer (F)] containing at least one unsaturation of ethylene type in amounts from 0.5% to 13% by weight, preferably from 0.6% to 11% by weight, and more preferably from 0.8% to 9% by weight, wherein a particular relation between comonomer (F) content and first melting temperature of polymer (F1) is satisfied.

20 Claims, 1 Drawing Sheet

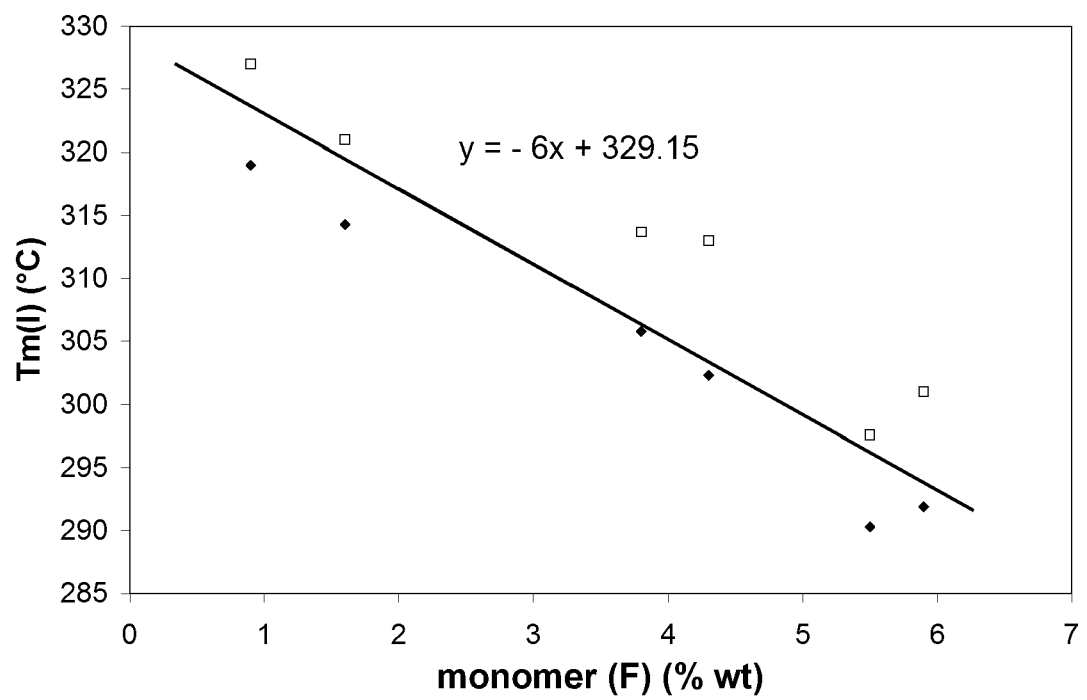

MELT-PROCESSABLE PERFLUOROPOLYMERS HAVING IMPROVED THERMAL AND MECHANICAL PROPERTIES AFTER HEATING TREATMENT

CROSS-REFERENCE TO RELATED APPLICATION

This application is a U.S. national stage entry under 35 U.S.C. § 371 of International Application No. PCT/EP2013/075194 filed Dec. 2, 2013, which claims priority to European application No. 12195595.9 filed on Dec. 5, 2012. The entire contents of these applications are explicitly incorporated herein by this reference.

TECHNICAL FIELD

The invention mainly pertains to a process for heat treating a melt-processable perfluorinated tetrafluoroethylene polymer to improve its thermal and mechanical properties, and the polymer products obtained after said heating treatment.

BACKGROUND ART

The tetrafluoroethylene/perfluoro(alkyl vinyl ether) copolymers, commercially known as PFA, are melt-processable polymers characterized by a high melting point, high thermal stability, chemical inertness and low dielectric constant, as well as good mechanical properties at room and elevated temperature. Generally, a commercial PFA polymer has a melting point of approximately 305° C. and a continuous use temperature of 260° C., wherein the parameter of continuous use temperature indicates the highest operating temperature the polymer can continuously withstand. Therefore, PFA polymers are widely used in industrial applications which require a high operating temperature and possibly a chemically aggressive environment, such as transportation pipes and heat exchanger in chemical process industry, communication cables for some extreme environments, and flexible risers operating at high temperatures.

Nevertheless, in many real-world industry applications in the oil and gas field, the need has been felt to have melt-processable polymer materials having a continuous use temperature beyond 260° C., to withstand extremely high operating temperatures encountered in construction work and the like. For instance, with deep drilling, a data communication cable can be exposed to temperatures of 280° C. or higher in a downhole well.

Recently, to address this limitation, related patent applications US 2012/0034406 A (E. I. DU PONT DE NEMOURS AND COMPANY) Sep. 2, 2012, US 2012/0035326 A (E. I. DU PONT DE NEMOURS AND COMPANY) Sep. 2, 2012, and US 2012/0031607 A (E. I. DU PONT NEMOURS AND COMPANY) Sep. 2, 2012 proposed a process to modify the existing PFA polymer, by incorporating a melt flowable polytetrafluoroethylene (PTFE) into the original PFA polymer and thereafter heat treating the resultant composition at a temperature of at least 280° C., wherein the melt flowable PTFE is a low molecular weight polymer (LMW PTFE). According to the aforecited applications, incorporation of LMW PTFE in the original PFA polymer is necessary, for improving the latter's integrity during heat treatment exposure and enables the resultant composition to exhibit improved physical properties such as flex-life value and tensile strength, a desirably low MFI (melt flowing index), and a relatively high continuous use temperature (i.e. greater than 260° C.).

Nevertheless, the approach of the aforecited applications requires: 1) the addition of selected LMW PTFE into the original co-polymer and 2) a fine-tune of the proportions between PFA and LMW PTFE for producing a desired result, which complicated the polymer modification process.

There is thus a need for a continuous search for new, simple approaches to modify the existing PFA polymer in order to improve its overall performance at room and elevated temperatures, in particular the properties like flex-life, MFI, tensile creep, barrier properties, and continuous use temperature.

SUMMARY OF INVENTION

The present invention provides a new solution to improve the overall performance (e.g. thermal and mechanical-physical properties) of a melt-processable perfluorinated tetrafluoroethylene copolymer, more particularly of a polymer formed of tetrafluoroethylene (TFE) copolymer with one or more perfluorinated comonomers. For the purpose of the present invention, a "melt-processible" polymer refers to a polymer that can be processed (i.e. fabricated into shaped articles such as films, fibers, tubes, fittings, wire coatings and the like) by conventional melt extruding, injecting or coating means. This generally requires that the melt viscosity of the polymer at the processing temperature be no more than $10^8$ Pa×sec, preferably from 10 to $10^6$ Pa×sec.

Specifically, in a first aspect, the invention pertains to a process for heat treating/aging a composition [composition (C)] which contains at least one melt-processible perfluoropolymer [polymer (F)] formed of tetrafluoroethylene (TFE) copolymer with one or more perfluorinated comonomers [comonomer (F)] containing at least one unsaturation of ethylene type in amounts from 0.5% to 13% by weight, preferably from 0.6% to 11% by weight, and more preferably from 0.8% to 9% by weight; the process comprising at least the step of heat-treating the composition (C) at a temperature of at least 260° C. in the absence of a melt flowable polytetrafluoroethylene (PTFE).

Surprisingly, without the need of adding a melt flowable PTFE, the polymer compositions subjected to the aforedescribed heat-treating process showed superior overall performance, including: a remarkably increased flex life accompanied with a decreased MFI, an increase in crystallinity as demonstrated by a higher first melting enthalpy, improved tensile properties and creep behaviour, a higher continuous use temperature above 260° C., as well as an enhanced permeation resistance, compared to the original composition (C) before the heat-treating process. Noticeably, the heat-treated polymer composition exhibits a satisfactory mechanical strength when exposed to a temperature higher than the continuous use temperature of the original composition (C).

As a result, said heat-treating process advantageously produces polymer compositions suitable for use at high operating temperature (e.g. above 260° C.) and extreme working environments. Particularly, said heat-treating process can be readily applied to a solid polymer composition, such as a solid shaped article manufactured from a molten polymer mixture, and increases the mechanical and barrier properties of the solid composition. For instance, said heat-treating process can be conveniently applied to a polymer membrane product to reduce its gas permeability and improve other thermo-mechanical properties thereof.

In a second aspect, the invention pertains to a melt-processible perfluoropolymer [polymer (F1)] formed of tetrafluoroethylene (TFE) copolymer with one or more perfluorinated comonomers [comonomer (F)] containing at least one unsaturation of ethylene type in amounts from 0.5% to 13% by weight, preferably from 0.6% to 11% by weight, and more preferably from 0.8% to 9% by weight, wherein the following inequality is satisfied:

$$Tm(I) > 329.15 - 6 \times [M]$$

wherein:
Tm(I) is the first melting temperature of the polymer (F1) and has the unit of Celsius degree;
[M] is the % weight of recurring units derived from said comonomer (F) in the polymer (F1).

Preferably, the polymer (F) of the present invention is semi-crystalline. For the purpose of the present invention, the term "semi-crystalline" is intended to denote a polymer having a heat of fusion of more than 1 J/g when measured by Differential Scanning calorimetry (DSC) at a heating rate of 10° C./min, according to ASTM D 3418. Preferably, the semi-crystalline polymer (F) of the invention has a heat of fusion of at least 15 J/g, more preferably of at least 25 J/g, most preferably at least 35 J/g.

The polymer (F) comprises advantageously more than 0.5% wt, preferably more than 2.0% wt, and more preferably at least 2.5% wt of comonomer (F).

The polymer (F) as above detailed comprises advantageously at most 20% wt, preferably at most 15% wt, and more preferably 10% wt of comonomer (F).

Good results have been obtained with the polymer (F) comprising at least 0.7% wt and at most 10% wt of comonomer (F).

Among suitable comonomers for comonomer (F), mentions can be made of:
$C_3$-$C_8$ perfluoroolefins, e.g. hexa-fluo-ro-propene (HFP), hexa-fluoroi-so-bute-ne;
$CF_2=CFOR_f$ perfluoroalkylvinylethers (PAVE), wherein $R_f$ is a $C_1$-$C_6$ perfluoroalkyl, e.g., —$CF_3$, —$C_2F_5$, or —$C_3F_7$—;
$CF_2=CFOX$ perfluorooxyalkylvinylethers wherein X is a $C_1$-$C_{12}$ perfluorooxyalkyl having one or more ether groups; and
perfluorodioxoles.

Preferably, said comonomer (F) is selected from the following comonomers:
PAVEs of formula $CF_2=CFOR_{f1}$, wherein $R_{f1}$ is selected from —$CF_3$, —$C_2F_5$, and —$C_3F_7$—, namely, perfluoromethylvinylether (PMVE) of formula $CF_2=CFOCF_3$), perfluoroethylvinylether (PEVE of formula $CF_2=CFOC_2F_5$), perfluoropropylvinylether (PPVE of formula $CF_2=CFOC_3F_7$), and mixtures thereof;
perfluoromethoxy vinyl ether (MOVE) of general formula $CF_2=CFOC$—$F_2$ $OR_{f2}$, wherein $R_{f2}$ is a linear or branched $C_1$-$C_6$ perfluoroalkyl group, cyclic $C_5$-$C_6$ perfluoroalkyl group, a linear or branched $C_2$-$C_6$ perfluoroxyalkyl group; preferably, $R_{f2}$ is —$CF_2CF_3$ (MOVE1), —$CF_2CF_2$ $OCF_3$ (MOVE2), or —$CF_3$ (MOVE3); and
perfluorodioxoles having the following formula:

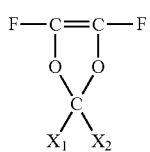

wherein $X_1$ and $X_2$, equal to or different from each other, are selected between F and $CF_3$, preferably F.

Particularly, good results have been achieved with polymer (F) containing comonomer (F) selected from PMVE, PEVE, PPVE, MOVE, and combinations thereof.

Noticeably, the polymer (F) can be made using TFE and several PAVE monomers as comonomer (F), such as the TFE/PMVE/PPVE copolymer, sometimes referred to as MFA by the manufacturer, but included as PFA for the purpose of the present invention.

According to one embodiment, polymer (F) is advantageously a TFE copolymer consisting essentially of:
(a) from 0.5 to 8%, preferably from 0.7 to 6% by weight of recurring units derived from PPVE;
(b) recurring units derived from TFE, in such an amount that the sum of the percentages of the recurring units (a) and (b) is equal to 100% by weight.

The expression 'consisting essentially of' is used within the context of the present invention for defining constituents of a polymer to take into account end chains, defects, irregularities and monomer rearrangements which might be comprised in said polymers in minor amounts, without this modifying essential properties of the polymer.

Optionally, polymer (F) of the invention further comprises recurring units derived from at least one $C_3$-$C_8$ perfluoroolefin.

According to another embodiment of the invention, the polymer (F) is advantageously a TFE copolymer consisting essentially of:
(a) from 0 to 6% by weight of recurring units derived from PMVE;
(b) from 0.4 to 5% by weight of recurring units derived from one or more than one fluorinated PAVE comonomer different from PMVE, preferably derived from PEVE and/or PPVE;
(c) from 0 to 6% by weight of recurring units derived from at least one $C_3$-$C_8$ perfluoroolefins, preferably derived from hexafluoropropylene (HFP); and
(d) recurring units derived from TFE, in such an amount that the sum of the percentages of the recurring units (a), (b), (c) and (d) is equal to 100% by weight.

Suitable polymer (F) for the present invention is commercially available from Solvay Specialty Polymers Italy S.p.A. under the trade name of HYFLON® PFA P and M series and HYFLON® MFA.

In one embodiment, the composition (C) of the invention contains polymer (F) as the sole component.

The composition (C) can be in the form of an article which is melt fabricated from the melt-processible polymer component(s) of the composition (C). For instance, the article can be selected from the following examples of articles: film, sheet, rods, pipes, cylinders, vessels, containers, wires & cables, and heat-exchanging tubes. The article can also be in the form of a modified melt-fabricated article such as convoluted tubing made from extruded tubing. Of particular interest are baskets and carriers and other articles injection molded from the composition (C), which would be used in chemical processing such as for carrying silicon wafers in semiconductor manufacture.

The composition (C) can also be in the form of extruded pellets, which can then be melt fabricated into the final form of the desired article.

The process of the present invention comprises at least the step of heat-treating the composition (C) at a temperature of at least 260° C. and in the absence of a melt flowable PTFE. For the purpose of the process of the present invention, the time of heat treatment for composition (C) will depend on the temperature of the heat treatment, and vice versa. Moreover, as apparent to one skilled in the art, the time of heat treatment for composition (C) can vary according to the practical requirement in the final product, or the size or bulk of the object being heat treated.

In general, the temperature of heat treatment for composition (C) in the process invention is preferably at least 270° C., more preferably at least 300° C., and most preferably at least 310-315° C. In this regard, the maximum temperature of heat treatment is such that the composition (C) is in the solid state during heat treatment, which means that the composition (C) does not flow and the original shape of the composition is still discernible during and after the heat treatment is carried out.

Advantageously, as aforementioned, the heat-treating process of the present invention can be readily applied to a solid shaped article. In contrast with the conventional heat-treating processes which are applied to a molten article, the process of the present invention can conveniently treat an article in a well-defined shape as designed for the expected use.

In other terms, according to certain embodiments, the process of the invention comprises a step of processing in the molten state the composition (C), as above detailed, so as to provide a solid shaped article thereof, and consequently heat treating, as above detailed, said composition (C) under the form of said solid shaped article.

Accordingly, in practicing the process of the invention, the maximum temperature of heat treatment is usually set below the initial melting temperature of the composition (C), and/or below the first melting temperature of the polymer (F).

Typically, the process of the invention comprises the step of heat-treating the composition (C) at a temperature of at least 260° C. Heating composition (C) for at least 24 hours or even longer time can produce further improvement in certain desired thermal/mechanical properties at high temperature, such as flex life (folding endurance) of the resultant composition. Preferably, the heating period of the heat treatment for composition (C) is at least 1 day, more preferably at least 2 days, and could run up to 4 days or even weeks. In a specific embodiment, the process of the invention comprises the step of heat-treating the composition (C) at a temperature of at least 300° C., for at least 2 days. In another preferred embodiment, the process of the invention comprises the step of heat-treating the composition (C) at a temperature of at least 310° C., for at least 2 days.

Generally, the heat treatment step of the process invention is carried out in an oven, which may contain air making up the medium enveloping the article.

According to the process of the present invention, the step of heat-treating the composition (C) is performed in the absence of a melt flowable PTFE. By 'melt flowable' it is meant that the PTFE has a non-zero melt flow rate that is measurable by ASTM D 1238-94a. This melt flowable PTFE may be obtained by direct polymerization under conditions that prevent very long polymer chains from forming, or by irradiation degradation of non-melt flowable PTFE. This melt flowable PTFE can be homopolymer of TFE or a copolymer thereof with a small amount of comonomer having at least one functional group. For instance, referring to US 2010/0036074 A (E.I. DU PONT DE NEMOURS AND COMPANY) Nov. 2, 2010, this melt flowable PTFE may be a copolymer of TFE with a hydrocarbon monomer having a carbon-carbon double bond and at least one functional group selected from the group consisting of amine, amide, carboxyl, hydroxyl, phosphonate, sulfonate, nitrile, boronate and epoxide, and more specifically may be a TFE copolymer having about 0.001 to about 1 weight percentage of at least one comonomer selected from the group consisting of chlorotrifluoroethylene, hexafluoropropylene, perfluoro-2,2-dimethyl-1,3-dioxole, perfluoro-2-methylene-4-methyl-1,3-dioxolane, perfluoro(methyl vinyl ether), perfluoro(ethyl vinyl ether), perfluoro(propyl vinyl ether) and perfluoro(butyl vinyl ether).

Such melt flowable PTFE is commonly called PTFE micropowder. It is not considered as being melt fabricable because the article molded from the melt is useless by virtue of extreme brittleness. An extruded filament of the PTFE micropowder is so brittle that it breaks upon flexing.

As the melt flowability of the melt flowable PTFE is generally considered as a result of its low molecular weight, it is referred as LMW PTFE in the aforementioned US patent applications of US 2012/0034406 A (E. I. DU PONT DE NEMOURS AND COMPANY) Sep. 2, 2012, US 2012/0035326 A (E. I. DU PONT DE NEMOURS AND COMPANY) Sep. 2, 2012, and US 2012/0031607 A (E. I. DU PONT NEMOURS AND COMPANY) Sep. 2, 2012. In contrast, for the purpose of the invention, the non-melt flowable PTFE refers to the PTFE that has zero melt flow rate as measured by ASTM D 1238-94a, due to its high molecular weight relative to the melt flowable PTFE.

The LMW PTFE can also be characterized by high crystallinity, preferably exhibiting a heat of crystallization of at least 50 J/g.

The LMW PTFE has melt flowability, which for example can be characterized by a melt flow rate (MFR) of at least 0.01 g/10 min, preferably at least 0.1 g/10 min and more preferably at least 5 g/10 min, and still more preferably at least 10 g/10 min, as measured in accordance with ASTM D 1238, at 372° C., using a 5 kg weight on the molten polymer.

While the LMW PTFE has low molecular weight, it nevertheless has sufficient molecular weight to be solid up to high temperatures, e.g. at least 300° C., more preferably at least 310° C., even more preferably, at least 320° C. According to one embodiment, one indicator of this sufficient molecular weight is that the LMW PTFE forms a viscous melt, such that when the polymer is subjected to the MFR determination in accordance with ASTM D 1238 at 372° C., using a 5 kg weight, the MFR of the polymer is preferably no greater than 100 g/10 min, preferably no greater than 75 g/10 min, even more preferably, no greater than 50 g/10 min. Each of these highest MFR amounts can be combined with any of the lowest MFRs mentioned above to form MFR ranges, e.g. 0.01-50 g/10 min, 0.01-75 g/10 min, 10-50 g/10 min, etc.

The LMW PTFE can be obtained in the form of PTFE micropowder from Solvay Specialty Polymers Italy S.p.A. under the trade name of Polymist® and Algoflon® L, or from DuPont Company under the trade name of ZONYL® fluoroadditive.

According to one embodiment of the process invention, the step of heat-treating the composition (C) is performed in the absence of PTFE polymer, wherein the PTFE polymer can be a homopolymer of TFE or a copolymer of TFE with at least one other fluorine-containing monomer in a small amount, e.g. not larger than about 2% by weight. These PTFE polymers are commercially available from Solvay Specialty Polymers Italy S.p.A. under the trade name of Algoflon® PTFE and from DuPont Company under the trade name of Teflon®.

As said, another aspect of the present invention pertains to a melt-processible perfluoropolymer [polymer (F1)] formed of tetrafluoroethylene (TFE) copolymer with one or more perfluorinated comonomers [comonomer (F)] containing at least one unsaturation of ethylene type in amounts from 0.5% to 13% by weight, preferably from 0.6% to 11% by weight, and more preferably from 0.8% to 9% by weight, wherein the following inequality is satisfied:

$$Tm(I) > 329.15 - 6 \times [M]$$

wherein:
Tm(I) is the first melting temperature of the polymer (F1) and has the unit of Celsius degree;
[M] is the % weight of recurring units derived from said comonomer (F) in the polymer (F1).

The polymer (F1) can be manufactured using the heat treating process as above detailed.

All features detailed herein above with reference to polymer (F) thus characterize preferred embodiments of the polymer (F1).

Still another aspect of the invention pertains to a method for manufacturing shaped articles comprising using the TFE copolymer of the invention as above detailed.

Standard polymer processing techniques as known in the art can be used in the method above mentioned, including but not limited to conventional melt extruding, injecting, and coating.

BRIEF DESCRIPTION OF DRAWINGS

FIG. 1 is a plot of first melting temperature, as determined by ASTM D4591 standard test method, as a function of weight percentage of comonomer (F), for the inventive TFE copolymers of the invention (open square $^{58}$) after the desired heat treatment and for comparative TFE copolymers as received (black solid squares ♦).

DESCRIPTION OF EMBODIMENTS

The invention will now be explained in more detail with reference to the following examples, whose purpose is merely illustrative and not intended to limit the scope of the invention.

EXAMPLE

Measurement of the Melt Flow Index (MFI)

The determination of the MFI was carried out according to the ASTM D1238 standard test method at 372° C. under a load of 5 Kg.

Measurement of the First Melting Temperature, Tm(I), and the Second Melting Temperature, Tm(II)

The first and second melting temperatures of the test samples were determined based on the ASTM D4591 standard test protocol, using a heating rate of 10° C. per minute. Specifically, the first melting temperature [Tm(I)] of the samples without receiving a heating treatment was evaluated on compression moulded specimen which are cooled in water, while for the heat-treated samples the Tm(I) was evaluated on samples cooled in air. For all samples, the second melting temperature [Tm(II)] was evaluated after cooling from 350° C. using a cooling rate of 10° C. per minute.

Measurement of the Mechanical Properties

Standard 1.5 mm-thick ASTM test specimens were obtained from compression moulded film of the test polymers.

The tensile properties were measured in accordance with ASTM D-3307. The modulus of elasticity (Mol. El) was measured according to an internal method based on evaluation of maximum slope of the curves obtained by pulling microtensile specimen described in ASTM D-3307, at a cross-head speed of 1 mm/min.

MIT flex life of the polymer was measured using the standard equipment described in ASTM D-2176-82T, on a moulded film having a thickness of approximately 0.3 mm.

Measurement of the Weight Percentage of the Perfluorinated Comonomer in the Polymer Determination of the perfluorinated comonomer content was carried out by FT-IR analysis and expressed as percent by weight.

The perfluorinated comonomer (F) content was determined under the followin-g conditions: the band optical density (OD) at 994 cm$^{-1}$ was nor-malized with the band optical density (OD) at 2365 cm$^{-1}$ by means of the following formula:

$$\text{Comonomer}(F)[\% \text{ wt}] = (\text{OD at 994 cm}^{-1})/(\text{OD at 2365 cm}^{-1}) \times 0.99.$$

Specifically, the PEVE or HFP content was determined by FTIR spectroscopy according to the method described in U.S. Pat. No. 5,703,185 (column 4, lines 9-16), using the multiplying coefficient 1, 3 as described therein. In order to carry out the IR spectrum subtraction, a TFE/MVE copolymer was used.

The PMVE content in a polymer was determined under the following conditions: a band optical density (OD) at 889 cm$^{-1}$ was normalized with the band optical density (OD) at 2365 cm$^{-1}$ by means of the following formula:

$$\text{PMVE}[\% \text{ wt}] = (\text{OD at 889 cm}^{-1})/(\text{OD at 2365 cm}^{-1}) \times 11.8$$

The PPVE content was determined under the following conditions: a band optical density (OD) at 994 cm$^{-1}$ is normalized with the band optical density (OD) at 2365 cm$^{-1}$ by means of the following formula:

$$\text{PPVE}[\% \text{ wt}] = (\text{OD at 994 cm}^{-1})/(\text{OD at 2365 cm}^{-1}) \times 0.99$$

Permeability/Gas Transmission Test

Gas transmission tests were conducted to measure gas permeability of original and heat-treated polymer compositions. Specifically, the measurement of gas permeability for each polymer sample was performed in a closed vessel, and the selected polymer composition was moulded into a film and separated two cells within the vessel. The test was carried out after evacuating air from the closed vessel and started by loading one of the two cells by the test gas at a pressure of approximately 1 atm. During the testing period the pressure in the downstream vessel cell gradually increased due to permeation through the film and, as a result, the permeability coefficient thereof was calculated from the pressure increase in the downstream cell at a steady state. In the Applicant's Experiment described below, nitrogen was used as the test gas and the testing temperature was set at 120° C.

Tensile Creep Test

Tensile creep test was performed according to ASTM D2990 standard test method, except using specimen with dimensions described in ISO 527-1A. No extensometers were used, and specimen shape correction was employed to ensure precise strain evaluation. All specimens were cut by hollow punch from compression molded sheets having a thickness of 1.5 mm. A small tensile creep strain is reflective of a good heat distortion (creep) resistance.

Materials

Polymer samples named as "PFA 1"-"PFA 6" are TFE/PAVE copolymers commercially available from Solvay Specialty Polymers Italy SpA, under the trade name of Hyflon® PFA.

Polymer samples of "Poly-A" and "Poly-B" are both TFE/MVE/EVE/HFP copolymers commercially available from Solvay Specialty Polymers Italy SpA, with the trade name of Hyflon® MFA F.

Example 1

A polymer sample (PFA 1, PFA 2, PFA 3, PFA 4, Poly-A, or Poly-B) as received was melt and subjected to MFI determination, shown as "original" MFI value in Table 1. After a 7-day heat treatment at 300° C. ("HT1"), a 2-day heat treatment at 310° C. ("HT2"), or a 7-day heat treatment at 285° C. ("HT3"), the MFI value was re-measured for each treated polymer, as indicated in Table 1.

TABLE 1

| Sample | PVE | HFP | MVE | EVE | TOT * | MFI (g/10 s) | | | |
|---|---|---|---|---|---|---|---|---|---|
| | (IR % w) | | | | | Org. | HT1 | HT2 | HT3 |
| PFA 1 | 0.9 | — | — | — | 0.9 | 5.0 | — | 1.2 | — |
| PFA 2 | 1.6 | — | — | — | 1.6 | 2.3 | 0.76 | — | — |
| PFA 3 | 3.8 | — | — | — | 3.8 | 2.0 | 0.5 | — | — |
| PFA 4 | 4.3 | — | — | — | 4.3 | 15.2 | 5.7 | — | — |
| Poly-A | — | 1.9 | 1.8 | 1.8 | 5.5 | 7.0 | — | — | 1.0 |
| Poly-B | — | 0.9 | 1.3 | 3.7 | 5.9 | 29 | — | — | 3.5 |

* TOT = % w (MVE + EVE + PVE + HFP)

As shown in Table 1, the MFI of each tested PFA polymer significantly decreased after receiving the heat treatment.

Example 2

The polymer samples of Example 1 (PFA 1, PFA 2, PFA 3, PFA 4, Poly-A and Poly-B) as received were subjected to the first and second melting temperature ("Tm(I)" and "Tm(II)", org.) measurements described above. After a 7-day heat treatment at 300° C. ("HT1"), a 2-day heat treatment at 310° C. ("HT2"), or 7-day heat treatment at 285° C. ("HT3"), the first and second melting temperatures were re-measured for each heat-treated PFA polymer, indicated in Table 2.

TABLE 2

| Sample | org. Tm(I) (° C.) | org. Tm(II) (° C.) | Tm(I) | | |
|---|---|---|---|---|---|
| | | | HT3 | HT1 | HT2 |
| PFA 1 | 319.0 | 319.5 | | | 327.0 |
| PFA 2 | 314.3 | 315.7 | 319.2 | 320.6 | 321.0 |
| PFA 3 | 305.8 | 307.7 | | 313.7 | |
| PFA 4 | 302.3 | 305.3 | | 313.0 | |
| Poly-A | 291.9 | 293.7 | 301.0 | | |
| Poly-B | 290.3 | 291.0 | 297.6 | | |

As shown in Table 2, the first melting temperature of each tested polymer sample noticeably increased after heat treatment for a period of time, implying an increase in crystallinity for each heat-treated polymer sample.

FIG. 1 is a plot of first melting temperature [Tm(I), ° C.] as a function of weight percentage of comonomer (F) for PFA 1-4, Poly-A and Poly-B after the desired heat treatment in Example 2 (open square □), and for comparative data of first melting temperature [org. Tm(I), ° C.] obtained from the as-received PFA 1-4, Poly-A and Poly-B (black solid squares ♦).

Example 3

While tensile testing at ambient temperature (23° C.) is generally relied upon for determining continuous use temperature, it is also desirable to know the mechanical properties of the PFA polymers at a high temperature (e.g. 280° C.). Therefore, the PFA 2 polymer used in Examples 1 and 2 was subjected to mechanical property measurements as detailed above, and the results were compared for PFA 2 before and after the 2-day heat treatment at 310° C. ("HT2"), as shown in Table 3.

TABLE 3

| Sample (PFA 2) | | |
|---|---|---|
| | Measuring Temperatures | |
| Mechanical Properties | 23° C. | 280° C. |
| Mod. El. (MPa) | 443 | 23 |
| Yield Stress (MPa) | 14.1 | 3 |
| Stress Break (MPa) | 30.6 | 6.2 |
| Elongation break (%) | 386 | 495 |
| After HT2 (310° C., 2 days) | | |
| Mod. El. (MPa) | 676 | 28 |
| Yield Stress (MPa) | 14.6 | 2.9 |
| Stress Break (MPa) | 31.4 | 8.0 |
| Elongation break (%) | 492 | 739 |

As shown in Table 3, the heat treatment of PFA 2 brought significant improvements in almost all aspects of tested mechanical properties, both at ambient temperature and at an elevated temperature as high as 280° C.

Example 4

PFA 2, PFA 3, PFA 4, and Poly-A as used in the previous examples were subjected to flex life measurement as described above, both before and after a 7-day heat treatment at 300° C. ("HT1"), or a 7-day heat treatment at 285° C. ("HT3"). The results are as shown in Table 4 below.

TABLE 4

| Sample | Flex-life (org.) | Flex-life (after HT1) | Flex-life (after HT3) |
|---|---|---|---|
| PFA 2 | 9 000 | 63 800 | |
| PFA 3 | 105 000 | >1 000 000 | |
| PFA 4 | 7 500 | 87 900 | |
| Poly-A | 8 000 | | 600 000 |

As indicated in Table 4, the flex life of the tested copolymers increased significantly after the heat treatment according to the present invention.

Example 5

Individual gas transmission test was performed for the "original" PFA 2 sample as received and the "heat-treated"

PFA 2 sample subjected to a 7-day heat treatment at 300° C., following the protocol described above. The $N_2$ permeability data recorded at 120° C. are listed in Table 5 below.

TABLE 5

| PFA 2 Sample | Film Thickness (mm) | $N_2$ permeability [cm³(STP)mm/m² · atm · d] |
|---|---|---|
| Original | 0.34 | 2270 |
| Heat-treated | 0.37 | 1430 |

As shown in Table 5, heat treating process according to the present invention notably reduced the gas permeability of the selected perfluoropolymer sample. This permeability reduction represents a real industrial advantage of the heat treated polymer according to the present invention, especially for chemical processing industrial applications which require high barrier properties.

Example 6

A polymer sample of PFA 5, which contains 3.3 wt % PVE comonomer and has an MFI value of 2.5 g/10 min, was subjected to a tensile creep test at a testing temperature of 280° C. and a testing stress of 1.0 MPa, for a long duration of 1000 hours. As the testing temperature used was well above 260° C., said tensile creep test was equivalent to a heat treatment process of the present invention.

During the 1000-hour long creep test, no rupture was observed in the test sample, for which the tensile creep was measured to be as small as 17.8%. This result shows that the test PFA material, after receiving a heating treatment according to the present invention, can be continuously used at elevated temperatures above 260° C. without forming rupture or crakes due to thermal stress.

Example 7

A polymer sample of PFA 6, which contains 4.2 wt % PVE comonomer and has an MFI value of 15.4 g/10 s, was heated to 300° C. in its solid state, for different durations (3 hours, 6 hours, 24 hours, 48 hours, and 168 hours). The MFI value of thus treated PFA 6 was re-measured after each heat treatment, as indicated in Table 6.

TABLE 6

| Heating time (h) | MFI (g/10 s) |
|---|---|
| 0 | 15.4 |
| 3 | 13.7 |
| 6 | 12.0 |
| 24 | 8.5 |
| 48 | 5.4 |
| 168 | 4.1 |

Obviously, compared to shorter heating treatments, heating the polymer for 24 hours or longer in its solid form led to further changes in the physical and thermal properties, as reflected in the rheological behaviour.

The invention claimed is:
1. A process for heat treating a composition (C) which contains at least one polymer (F), wherein polymer (F) is a melt-processible perfluoropolymer formed of tetrafluoroethylene (TFE) copolymer with one or more perfluorinated comonomer (F) containing at least one ethylene unsaturation in amounts from 0.5% to 13% by weight based on the total weight of polymer (F); the process comprising heat-treating composition (C) at a temperature of at least 260° C. and in the absence of a melt flowable polytetrafluoroethylene (PTFE):
for at least 24 hours, and/or
wherein the maximum temperature of heat-treating composition (C) is:
(i) a temperature such that composition (C) is in the solid state during heat treatment; and/or
(ii) below the initial melting temperature of composition (C); and/or
(iii) below the initial melting temperature of polymer (F).
2. The process according to claim 1, wherein comonomer (F) contains at least one ethylene unsaturation in amounts from 0.6% to 11% by weight based on the total weight of polymer (F).
3. The process according to claim 1, wherein comonomer (F) contains at least one ethylene unsaturation in amounts from 0.8% to 9% by weight based on the total weight of polymer (F).
4. The process according to claim 1, wherein comonomer (F) is selected from:
$C_3$-$C_8$ perfluoroolefins;
$CF_2$=$CFOR_f$ perfluoroalkylvinylethers (PAVE), wherein $R_f$ is a $C_1$-$C_6$ perfluoroalkyl;
$CF_2$=CFOX perfluorooxyalkylvinylethers wherein X is a $C_1$-$C_{12}$ perfluorooxyalkyl having one or more ether groups; and
perfluorodioxoles.
5. The process according to claim 4, wherein comonomer (F) is selected from the following comonomers:
PAVEs selected from perfluoromethylvinylether (PMVE), perfluoroethylvinylether (PEVE), perfluoropropylvinylether (PPVE), and mixtures thereof;
perfluoromethoxy vinyl ether (MOVE) of general formula $CF_2$=$CFOCF_2OR_{f2}$, wherein $R_{f2}$ is a linear or branched $C_1$-$C_6$ perfluoroalkyl group, cyclic $C_5$-$C_6$ perfluoroalkyl group, a linear or branched $C_2$-$C_6$ perfluoroxyalkyl group; and
perfluorodioxoles having the following formula:

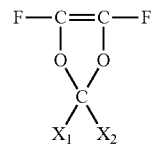

wherein $X_1$ and $X_2$ are equal to or different from each other, and are selected from F and $CF_3$.
6. The process according to claim 4, wherein comonomer (F) is selected from PMVE, PEVE, PPVE, MOVE, and combinations thereof.
7. The process according to claim 4, wherein polymer (F) is a TFE copolymer consisting essentially of:
(a) from 0.5 to 8% by weight of recurring units derived from PPVE; and
(b) recurring units derived from TFE, in such an amount that the sum of the percentages of the recurring units (a) and (b) is equal to 100% by weight.
8. The process according to claim 1, wherein polymer (F) further comprises recurring units derived from at least one $C_3$-$C_8$ perfluoroolefin.
9. The process according to claim 6, wherein polymer (F) is a TFE copolymer consisting essentially of:

(a) from 0 to 6% by weight of recurring units derived from PMVE;
(b) from 0.4 to 5% w by weight of recurring units derived from one or more than one fluorinated PAVE comonomer different from PMVE;
(c) from 0 to 6% by weight of recurring units derived from at least one $C_3$-$C_8$ perfluoroolefins; and
(d) recurring units derived from TFE, in such an amount that the sum of the percentages of the recurring units (a), (b), (c) and (d) is equal to 100% by weight.

10. The process according to claim 1, wherein composition (C) consists of polymer (F).

11. The process according to claim 1, wherein the temperature of heat treatment for composition (C) is at least 270° C.

12. The process according to claim 1, wherein heat-treating composition (C) is carried out at a temperature of at least 260° C. for at least 24 hours and wherein the maximum temperature of heat-treating composition (C) is:
   (i) a temperature such that composition (C) is in the solid state during heat treatment;
   (ii) below the initial melting temperature of composition (C); and/or
   (iii) below the initial melting temperature of polymer (F).

13. A process according to claim 1, further comprising processing composition (C) in a molten state, so as to provide a solid shaped article, such that heat treating composition (C) occurs while composition (C) is in the form of said solid shaped article.

14. A polymer (F1), wherein polymer (F1) is a melt-processible perfluoropolymer formed of tetrafluoroethylene (TFE) copolymer with one or more perfluorinated comonomer (F) containing at least one unsaturation in amounts from 0.5% to 13% by weight based on the total weight of polymer (F), wherein the following inequality is satisfied:

$$Tm(I) > 329.15 - 6 \times [M]$$

wherein:
Tm(I) is the initial melting temperature of polymer (F1) measured in degrees Celsius;
[M] is the % weight of recurring units derived from comonomer (F) in polymer (F1).

15. The polymer (F1) of claim 14, wherein polymer (F1) is made by a process comprising heat-treating polymer (F1) at a temperature of at least 260° C. and in the absence of a melt flowable polytetrafluoroethylene (PTFE):
   for at least 24 hours, and/or
   wherein the maximum temperature of heat-treating polymer (F1) is:
   (i) a temperature such that polymer (F1) is in the solid state during heat treatment; and/or
   (ii) below the initial melting temperature of polymer (F1).

16. The polymer (F1) of claim 14, wherein comonomer (F) contains at least one ethylene unsaturation in amounts from 0.6% to 11% by weight.

17. The polymer (F1) of claim 14, wherein comonomer (F) contains at least one ethylene unsaturation in amounts from 0.8% to 9% by weight based on the total weight of polymer (F).

18. The process according to claim 5, wherein comonomer (F) is selected from the following comonomers:
   PAVEs selected from $CF_2=CFOCF_3$, $CF_2=CFOC_2F_5$, $CF_2=CFOC_3F_7$, and mixtures thereof;
   MOVEs selected from $CF_2=CFOCF_2OCF_2CF_3$, $CF_2=CFOCF_2OCF_2CF_2OCF_3$, or $CF_2=CFOCF_2OCF_3$; and
   perfluorodioxoles having the following formula:

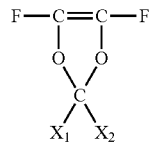

wherein $X_1$ and $X_2$ are each F.

19. The process according to claim 11, wherein the temperature of heat treatment for composition (C) is at least 300° C.

20. The process according to claim 11, wherein the temperature of heat treatment for composition (C) is at least 310° C.

* * * * *